(12) United States Patent
Buogo et al.

(10) Patent No.: US 11,445,883 B2
(45) Date of Patent: Sep. 20, 2022

(54) DISHWASHING MACHINE AND METHOD

(71) Applicant: Reckitt Benckiser Finish B.V., Hoofddorp (NL)

(72) Inventors: Alberto Buogo, Hull (GB); Callum Couser, Heidelberg (DE); Frank Dierkes, Heidelberg (DE); Jorg Pflug, Heidelberg (DE); Karl-Heinz Mohrhard, Heidelberg (DE); Caroline Rigobert, Heidelberg (DE)

(73) Assignee: Reckitt Benckiser Finish B.V., Hoofddorp (NL)

( * ) Notice: Subject to any disclaimer, the term of this patent is extended or adjusted under 35 U.S.C. 154(b) by 0 days.

(21) Appl. No.: 16/097,341

(22) PCT Filed: Apr. 20, 2017

(86) PCT No.: PCT/EP2017/059432
§ 371 (c)(1),
(2) Date: Oct. 29, 2018

(87) PCT Pub. No.: WO2017/186579
PCT Pub. Date: Nov. 2, 2017

(65) Prior Publication Data
US 2019/0133404 A1    May 9, 2019

(30) Foreign Application Priority Data

Apr. 29, 2016 (GB) .................. 1607612

(51) Int. Cl.
*A47L 15/00* (2006.01)
*C11D 11/00* (2006.01)
(Continued)

(52) U.S. Cl.
CPC ....... *A47L 15/0007* (2013.01); *A47L 15/0055* (2013.01); *A47L 15/4418* (2013.01);
(Continued)

(58) Field of Classification Search
CPC ............ A47L 15/0007; A47L 15/4418; A47L 15/4463; C11D 3/3956; C11D 3/3953; C11D 11/0023
See application file for complete search history.

(56) References Cited

U.S. PATENT DOCUMENTS

| 6,368,420 B1 | 4/2002 | Angevaare et al. |
| 2005/0224098 A1* | 10/2005 | Fujii ................... A47L 15/0055 134/26 |

(Continued)

FOREIGN PATENT DOCUMENTS

| EP | 1586263 A2 | 10/2005 |
| JP | 2010194060 A | 9/2010 |

(Continued)

OTHER PUBLICATIONS

Combined Search and Examination Report issued in related application No. GB1607612.7 dated Oct. 27, 2016.

(Continued)

*Primary Examiner* — Mikhail Kornakov
*Assistant Examiner* — Pradhuman Parihar
(74) *Attorney, Agent, or Firm* — Troutman Pepper Hamilton Sanders LLP; Ryan A. Schneider; Chris N. Davis

(57) ABSTRACT

The invention relates to a method of automatic dishwashing, comprising: placing soiled wares inside a cleaning volume; providing a first cleaning composition comprising a bleach and a second cleaning composition different from the first composition; and delivering the first composition and the second composition separately to the cleaning volume to contact the soiled wares, wherein: the first composition is delivered to the cleaning volume as a mist and the second composition is delivered to the cleaning volume as a jet; and the first and second compositions are delivered to the cleaning volume at a temperature below 100° C. The inven- (Continued)

tion also relates to a dishwasher and a kit for use in the inventive method.

6 Claims, 2 Drawing Sheets

(51) Int. Cl.
    *C11D 3/386*     (2006.01)
    *C11D 3/39*     (2006.01)
    *A47L 15/44*     (2006.01)
    *C11D 3/395*     (2006.01)

(52) U.S. Cl.
    CPC .......... *A47L 15/4463* (2013.01); *C11D 3/386* (2013.01); *C11D 3/38618* (2013.01); *C11D 3/39* (2013.01); *C11D 3/3947* (2013.01); *C11D 3/3953* (2013.01); *C11D 3/3956* (2013.01); *C11D 11/0023* (2013.01)

(56) References Cited

U.S. PATENT DOCUMENTS

| | | | |
|---|---|---|---|
| 2006/0090775 A1* | 5/2006 | De Kuyper | A47L 15/0055 134/25.2 |
| 2011/0220149 A1* | 9/2011 | Thiyagarajan | A47L 15/23 134/18 |
| 2014/0261561 A1* | 9/2014 | Nunes | C11D 1/06 134/25.2 |
| 2015/0075568 A1* | 3/2015 | Skop | A47L 15/44 134/25.2 |
| 2018/0103822 A1* | 4/2018 | Campbell | A47L 15/0055 |

FOREIGN PATENT DOCUMENTS

| | | |
|---|---|---|
| WO | 2013160661 A1 | 10/2013 |
| WO | 2016020680 A1 | 2/2016 |
| WO | WO-2016020680 A1 * | 2/2016 ......... A47L 15/4472 |

OTHER PUBLICATIONS

International Search Report and Written Opinion issued in International Application No. PCT/EP2017/059432 dated Jul. 18, 2017.

* cited by examiner

DISHWASHING MACHINE AND METHOD

CROSS-REFERENCE TO RELATED APPLICATIONS

This application is a national stage entry of, and claims priority to, PCT/EP2017/059432 filed 20 Apr. 2017, which claims priority to GB Patent Application No. 1607612.7 filed 29 Apr. 2016, the disclosures of both of which are herein incorporated by reference in their entireties.

TECHNICAL FIELD

The present invention relates to a method of automatic dishwashing. The invention also relates to an automatic dishwashing machine that is configured to carry out the inventive method.

BACKGROUND

Modern household appliances need to meet increasingly stringent demands for their energy efficiency. Automatic cleaning machines like automatic dishwashers should also desirably offer reduced consumption of water and detergent chemicals, for the sake of the environment. Using a relatively low volume of water offers the possibility of added benefits of reduced energy consumption and shorter cycle times, since it takes less energy and time to heat a smaller volume of water to the required wash temperature. However, with current technology, there is considered to be a limit to the amount that water and detergents can be reduced whilst still meeting consumer expectations for the wash performance.

Different types of automatic dishwashing machines exist, which tend to be designed very differently for the domestic market versus the commercial/institutional markets. Generally the differences are in terms of size and volume of throughput. Industrial/institutional machines often have much shorter but more energy intensive (e.g. higher temperature) cycles compared to domestic machines, and/or use much more aggressive chemistry (e.g. very highly alkaline detergent). Typically, they will not use enzymes, because these need a certain contact time with the treated soils to perform effectively, and the commercial cycle time is too short. In the case of non-domestic dishwashers, the machines can be based on a conveyor system in which dishware is moved through a single or multiple tanks of the dishwasher, whereas in domestic machines the dishware will generally always remain stationary in a tank inside the dishwasher, and all the washing steps will occur in that tank. (Generally, domestic machines only have a single tank.) Also, non-domestic machines may or may not be open systems (e.g. comprising a conveyor that is exposed to the environment), whereas domestic machines nowadays all operate as a closed system (the tank(s) are closed by at least one door).

The conventional household dishwasher design involves one or more spray arms positioned inside the machine. Heated wash water is pumped to the spray arms, which rotate to spread the water around the wares being washed. The mechanical action of the water hitting the wares is seen to be a crucial contributor to the cleaning performance achieved. Whereas industrial dishwashers may have separate spray arms for the washing and rinsing/sanitizing stages, domestic dishwashers traditionally use the same spray arms for all phases of the program cycle.

Reduced capacity dishwashers have been marketed, such as small countertop dishwashers and dual-drawer dishwashers, to address the needs of consumers who may generate fewer dishes to be washed. They may use a reduced absolute volume of water per cycle, but they do not address the problem of how to reduce the consumption of water relative to the total surface area of the items being washed.

There are also domestic dishwashers available that can vary the spray pressure according to the wash program selected by the consumer. For instance, the machine may switch to use a higher spray pressure when the consumer selects a program to wash heavily soiled items, whilst a lower spray pressure is used when a delicate wash program is selected. Some machines claim to automatically detect the soiling level of the dishes and adjust the water consumption accordingly. Others have specific wash zones allowing the consumer to place more heavily soiled items in zones that will be targeted with higher water pressure. Again, these machines do not address the problem of how to achieve good performance even on a large volume of heavily soiled items, whilst still using less water.

Various documents disclose the use of steam during an automatic dishwashing method, but this is very energy inefficient.

WO2013/160661 (RB) discloses a method of automatic dishwashing comprising contacting soiled wares with a detergent mist, atomized to a size wherein >95% of the particles have a diameter less than 2 microns. A single mist source nozzle can be used and the smaller particles are said to fill the dishwasher more rapidly, behaving in a gas-like way and reaching the surface of items which do not have a "line of sight" from the nozzle. The small particles apparently penetrate into the food soils more effectively. In this document, whilst a rinse aid may be delivered separately after the main wash, there is no sequential dosing of different detergent ingredients during the main wash, and no teaching to use different delivery mechanisms for different compositions during the cycle. In addition, in the case where the consumer can open the machine mid-cycle, it is desirable to avoid the use of such a small size of mist, which can penetrate the lungs.

Similarly, EP1586263 (Panasonic) discloses using a mist for a first pre-cleaning step which allows detergent to permeate into the soils, followed by a second main cleaning step to remove the soils from the surface. The mist is atomized in the order of microns, and may be created by an ultrasonic vibrator, or by a spray nozzle positioned perpendicular to an air jet nozzle. A rising air current is used to convey the atomised mist onto the wares. The use of different detergent ingredients in the two steps is not disclosed. Depending on exact the size of the mist, this method could also suffer from the consumer safety problem discussed above.

EP0487474 (Electrolux) suggests using ultrasound or aerosol methods to create a "cold" liquid fog of a composition comprising surfactant or enzymes, which condenses on the plates. The droplet diameter is controlled in the range 0.5-25 microns, which again could be too small from a consumer safety perspective. A conventional spray arm is also present in the machine.

It is one of the known options in the art to store enzymes and bleach separately and dose them into the wash at different times in the cycle, to avoid adverse interactions during storage and, when enzymes are supplied before bleach, prevent deactivation of enzyme by bleach during the wash. Examples of documents teaching the release of enzymes into the wash before bleach include US 2012/0214723, US 2011/0000511, US 2009/0314313, and US 2010/0212700.

However, these documents do not suggest using a different spray mechanism for delivery of enzymes compared to delivery of bleach.

SUMMARY OF THE INVENTION

The present inventors have now found that, whilst delivering the whole detergent composition as a mist does reduce water consumption, performance is sub-optimal compared with using the traditional spray mechanism, because for certain types of soils, the mechanical action of the water is very important for cleaning. Specifically, cleaning of some soils benefits from the mechanical action of the water, whereas bleachable soils can be removed without needing a high spray force. It has consequently been discovered that it is possible to reduce water consumption without compromising performance, by delivering the bleach and second cleaning composition in different types of spray mechanism which are tailored to the respective detergent ingredient.

According to a first aspect of the invention, there is provided a method of automatic dishwashing comprising: delivering a first cleaning composition comprising a bleach and a second cleaning composition different from the first composition separately to a cleaning volume to contact soiled wares; wherein: the first composition is delivered to the cleaning volume as a mist and the second composition is delivered to the cleaning volume as a jet; and the first and second compositions are delivered to the cleaning volume at a temperature below 100° C.

According to a second aspect of the invention, there is provided an automatic dishwasher comprising: a cleaning volume for receiving soiled wares; first delivery means that is connectable to a source of a first cleaning composition comprising a bleach, wherein the first delivery means is adapted to deliver the first cleaning composition to the cleaning volume as a mist at a temperature below 100° C.; and second delivery means that is connectable to a source of a second cleaning composition which is different from the first cleaning composition, wherein the second delivery means is adapted to deliver the second cleaning composition to the cleaning volume as a jet at a temperature below 100° C.

According to a third aspect of the invention, there is provided a kit comprising: an automatic dishwasher as described herein; the first cleaning composition; and the second cleaning composition.

DETAILED DESCRIPTION

Figure 1:
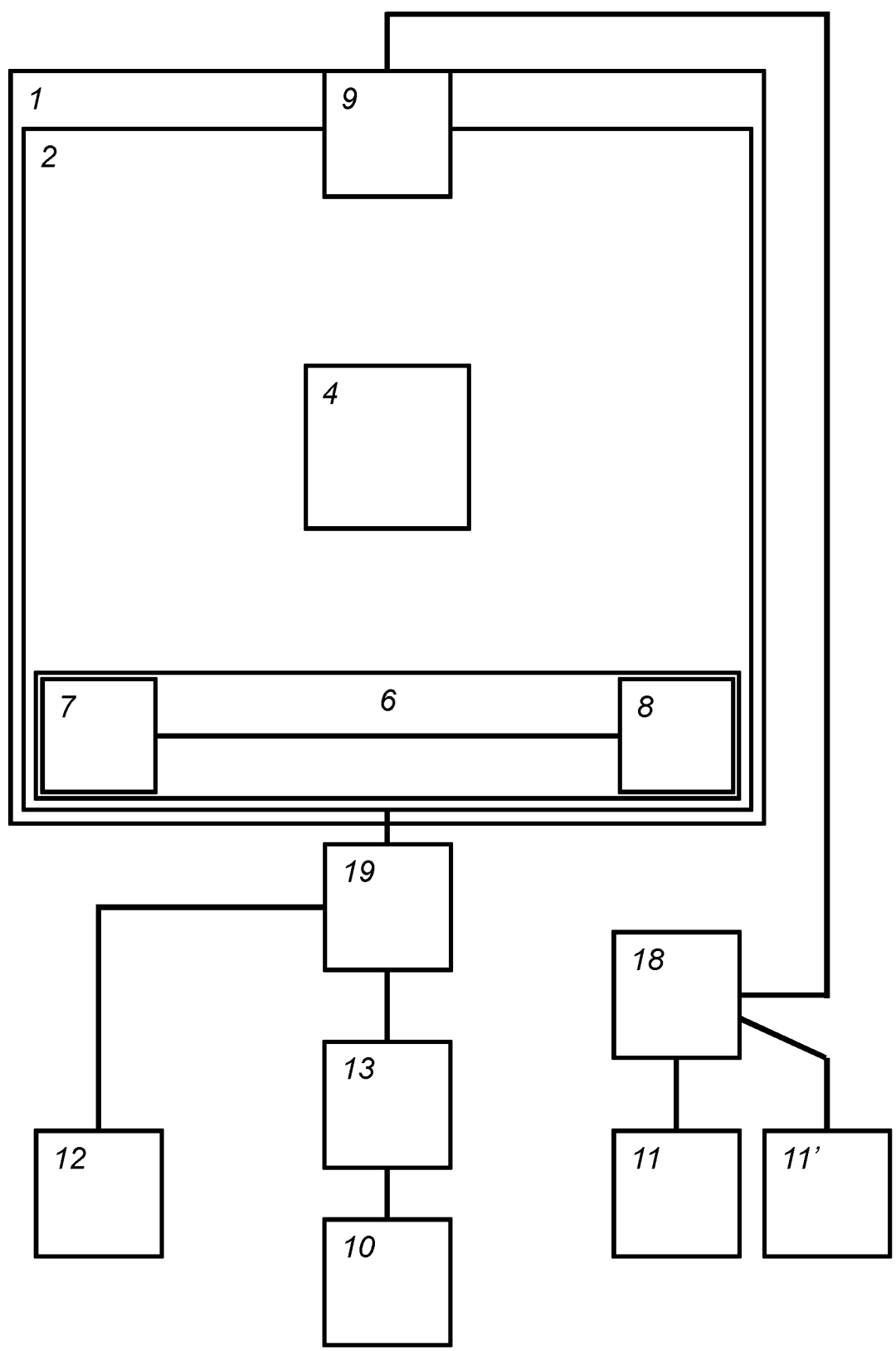
FIG. 1 illustrates a schematic embodiment of an automatic dishwasher according to the present invention.

According to the present invention, the bleach composition is delivered as a mist, and the second composition (preferably comprising enzyme) is delivered as a jet. The different nature of the first and second compositions means that delivering each composition in this matter produces effective cleaning of the soiled items 4 in the cleaning volume 2. As described herein, the second composition is aided by the mechanical action of delivery, while the bleach composition is not. By delivering the two compositions in this manner, the volume of water required may be reduced. In particular, much less water is required to deliver the first composition as a fine mist than using traditional spray arms. In addition, there are benefits to delivering the bleach composition as a mist as this ensures a more even distribution throughout the whole of the cleaning volume 2.

The jet and mist relationship may be defined by a number of means. In an embodiment, the first composition is delivered at a lower momentum than the second composition. In an embodiment, the first composition is delivered with a lower mass flow rate than the second composition. In an embodiment, the density of the plume of the first composition is lower than the density of the jet of the second composition. The plume of the jet and the mist immediately after the nozzle may be considered, and the density of the mist will be lower than the density of the jet. In particular, these comparisons may result in a ratio for each parameter of at least 2:1 but preferably 3:1 between the mist and the jet.

In certain embodiments, the ratio of momentum or mass flow rate or density between the first and second compositions is at least 1:2, preferably it is at least 1:3.

In an embodiment, the first composition is delivered with a mean particle size of 5 to 500 microns. In an embodiment, 50% of the particles have a diameter of less than 60 microns.

Preferably, the first composition is delivered with a mean particle size of: greater than 50 microns, greater than 60 microns, or greater than 70 microns; and/or less than 400 microns, less than 300 microns, less than 200 microns or less than 100 microns. It has been found that this provides an improved consumer safety profile whilst still delivering good performance. In an embodiment, the mist has DV(10)=35 microns, 40 microns, or 50 microns, where DV(X) means that X % of the particles are smaller than the quoted value.

For example, the mist particle size may be DV(10)=35 microns, DV(50)=50 microns, and DV(90)=120 microns.

In an embodiment, the dishwasher may not be openable by the user (e.g. it may be locked in a closed state) during the period of time when the first composition is being delivered. This could improve the safety profile further and/or allow for smaller particle sizes to be used.

The first and second compositions may each independently be created in-situ by a method comprising dissolving and/or suspending respective solid compositions in water. For example, one or more bleach-containing formulations and one or more separate cleaning (preferably enzyme-containing) formulations may independently be stored in a particulate or compressed particulate state, and dissolved and/or suspended inside the machine as and when needed, to create the respective first and second compositions. Preferably, both are stored in the form of separate tablets or "pellets". This may allow them to be dissolved and/or suspended shortly before use so that the first and second compositions are created fresh each time, which may provide stability advantages especially for the preferred ingredients and conditions of storage. The required ingredients may be provided in the same tablet/pellet or separated into different tablets/pellets. For example, an amylase-containing pellet and a separate protease-containing pellet is dissolved and mixed together to form the second composition, or multiple pellets each containing both amylase and protease are dissolved together to provide the right dosage level for the second composition.

The bleach may be an oxygen-based bleach or a chlorine-based bleach, but oxygen-based bleaches are preferred. Typical bleach compositions are based on either hydrogen peroxide or a hydrogen peroxide precursor. Examples include percarbonates, persulfates and perborates, typically as alkali metal salts.

In addition to the bleach component, a bleach activator is typically included in the first composition to allow the bleach to function under less alkaline/lower temperature conditions. Suitable bleach activators are well known in the art and an example is tetracetyl ethylene diamine (TAED). Optionally a catalyst can also be added to enhance bleach activity. Common bleach catalysts are manganese acetate and dinuclear manganese complexes. As an example, a first composition could include the bleach active, activator and catalyst in a ratio of 1:0.1:0.05 or similar. In an embodiment, the mist comprises 0.1-0.5% w/w bleach.

In addition to these components, the first composition may also include one or more of a builder, co-builder, a source of alkalinity and a wetting agent or surfactant.

The second cleaning composition is different from the first cleaning composition. Preferably it is bleach-free. It may contain any suitable ingredient such as an alkalinity source, builder, co-builder, surfactant or polymer. In certain embodiments the second composition comprises at least one enzyme. Preferably, the enzyme is selected from the group consisting of amylase, protease, cellulose, pectinase, mannanase, lipase, lipoxygenase, tannase, laccase, peroxygenase, and gluco-oxygenase. Preferably, the second composition comprises amylase and/or protease. Preferably, it comprises a combination of amylase and protease.

In an embodiment, the jet comprises approximately 0.1%-0.5% active enzyme material. Preferably, the jet comprises an amylase in an amount of 0.000001-0.0001 wt % (by active enzyme content). Preferably, the jet comprises a protease in an amount of 0.0001-0.1 wt % (by active enzyme content). In an embodiment, the second composition is created by dissolving and/or suspending one or more solid formulations, at least one of which comprises amylase in an amount of 0.001-0.1 wt % (by active enzyme content) and at least one of which comprises protease in an amount of 0.1-2 wt % (by active enzyme content).

The first and second cleaning compositions may be delivered to the cleaning volume in either order. In a preferred embodiment, the first composition comprising the bleach is delivered prior to the second composition.

Preferably the method further comprises delivering at least one rinsing composition to the cleaning volume to contact the soiled wares. It may be delivered as a mist or a jet, but preferably, the rinsing composition is delivered as a mist, preferably the same type of mist as the first composition. The rinsing composition preferably comprises a surfactant, preferably a non-ionic surfactant. Alternatively the rinsing composition is water or deionized water.

In certain embodiments a rinsing composition is delivered after delivering the first and second compositions. In certain embodiments a rinsing composition is delivered between the delivery of the first and second compositions.

While the present invention is not limited to a particular order for the washing cycle, a typical method may comprise the following steps in the recited order:
 1. Delivering the bleach composition as a fine mist to the soiled wares;
 2. Draining the bleach composition from the cleaning volume;
 3. Optionally, delivering a first rinsing composition as a mist or jet to rinse the bleach composition from the soiled wares;
 4. Draining the rinsing mixture from the cleaning volume;
 5. Delivering the second cleaning composition as a jet to the soiled wares;
 6. Draining the second cleaning composition from the cleaning volume;
 7. Optionally, delivering a second rinsing composition as a mist or jet to rinse the second composition from the soiled wares, and optionally delivering a third rinsing composition to the wares; and
 8. Draining the rinsing mixture from the cleaning volume.

Preferably, the first rinsing composition comprises a non-ionic surfactant. Preferably, the second rinsing composition comprises a non-ionic surfactant and is preferably delivered as a mist. Preferably, the third rinsing composition is water or deionized water and is preferably delivered as a mist.

However, one or more of the rinsing steps may be excluded, and the bleach and second cleaning composition order may be changed without deviating from the present invention.

The dishwasher of the invention may have any suitable adaptation to allow it to deliver the first composition as a mist and the second composition as a jet. Devices suitable for producing a fine mist include but are not limited to ultrasonic or piezo actuators, heating elements, compositions including a propellant, cavitation, high shear stress pumps or nozzles configured accordingly. In addition, there may be multiple mist generation devices within the cleaning volume. The first delivery means may or may not be an atomizer. Preferably, the second delivery means comprises a nozzle. Preferably, the first delivery means comprises a smaller spray nozzle than the second delivery means.

The dishwasher may comprise a nozzle that is adjustable between a first configuration for delivering the first composition as a mist, and a second configuration for delivering the second composition as a jet.

The first, bleach-containing composition is delivered to the cleaning volume below 100° C. so it is not delivered as a steam. Preferably the temperature is at least 45° C., more preferably at least 50° C., more preferably at least 55° C. and most preferably at least 60° C. The second composition is delivered to the cleaning volume below 100° C. so it is not delivered as a steam. Preferably the temperature is at least 20° C., more preferably at least 30° C., more preferably at least 35° C. and most preferably at least 40° C.

Preferably there is a receptacle for a rinsing composition which is preferably connected to the first delivery means.

The jet may be distributed to and around the wares by conventional means, for example the impulse of the liquid being ejected from at least one spray arm may be sufficient to cause rotation of the spray arm and so transport of the jet around the cleaning volume. On the other hand, the impulse of the mist (or the volume of the mist to be used) may not itself be great enough to cause rotation of a rotational spray arm. It is desirable to provide as even as possible a distribution of the mist throughout the cleaning volume, so alternative options include delivering the mist through at least one electrically-powered/motorised rotating spray arm, and/or at least one electrically-powered/motorised linearly-moving spray bar which may "scan" or oscillate across a length or width of the cleaning volume. In an embodiment, the mist is delivered to the cleaning volume in an area above the wares; preferably, the mist is capable of being transported onto the wares even in the absence of convection air currents. For example, the particle size of the mist may optionally be such that the mist tends to drop down by gravity onto the area(s) in which the wares are located, although convection air currents may additionally be involved in transporting the mist around the cleaning volume.

FIG. 1 illustrates a schematic embodiment of an automatic dishwasher 1 according to the present invention. The automatic dishwasher 1 is connected to a water supply 10. First and second receptacles 11, 12 are provided, which are for receiving a source of the first and second cleaning agents respectively. Each receptacle is in fluid communication with a supply line. The first agent comprises a bleach and the second agent preferably comprises an enzyme.

The automatic dishwasher 1 is provided with a cleaning volume 2, in which soiled items 4 are placed in order to be cleaned. A spray arm 6 is also mounted within the cleaning volume 2. The spray arm 6 is provided with nozzles 7, 8. In one embodiment, the spray arm 6 is rotatably mounted to a bottom surface of the cleaning volume 2. However, it may instead be rotatably mounted or otherwise to any surface within the cleaning volume 2. Further spray arms may also be mounted within the cleaning volume 2 in order to deliver the compositions.

A heating element 13 is also provided in fluid communication with the water supply 10. Downstream of the heating element, valving is provided for selectively delivering the heated water to first or second supply lines. The first water supply line is arranged to intercept with the supply line in fluid communication with the first receptacle. The first composition may be supplied via intermediate region 18. This composition is delivered to the cleaning volume 2 via an atomizer 9. The atomizer 9 is configured to deliver this composition as a mist to the cleaning volume. While the particular embodiment of FIG. 1 uses an atomizer, this is not a requirement and element 9 may instead be a spray means adapted to create a mist having one or more of the features discussed above.

The second water supply line is arranged to intercept with the supply line in fluid communication with the second receptacle. The second composition may be delivered via a second intermediate region 19. This composition is delivered to the cleaning volume 2 via the nozzles 7, 8 on the spray arm 6. The nozzles are configured to deliver this composition in the form of one or more jets to the cleaning volume.

The automatic dishwasher may also be provided with a receptacle 11' for a source of a rinsing composition. This rinsing composition supply 11' is also connected to the atomizer 9 and may be delivered to the cleaning volume 2 as a mist to rinse the soiled wares 4.

Figure 2:
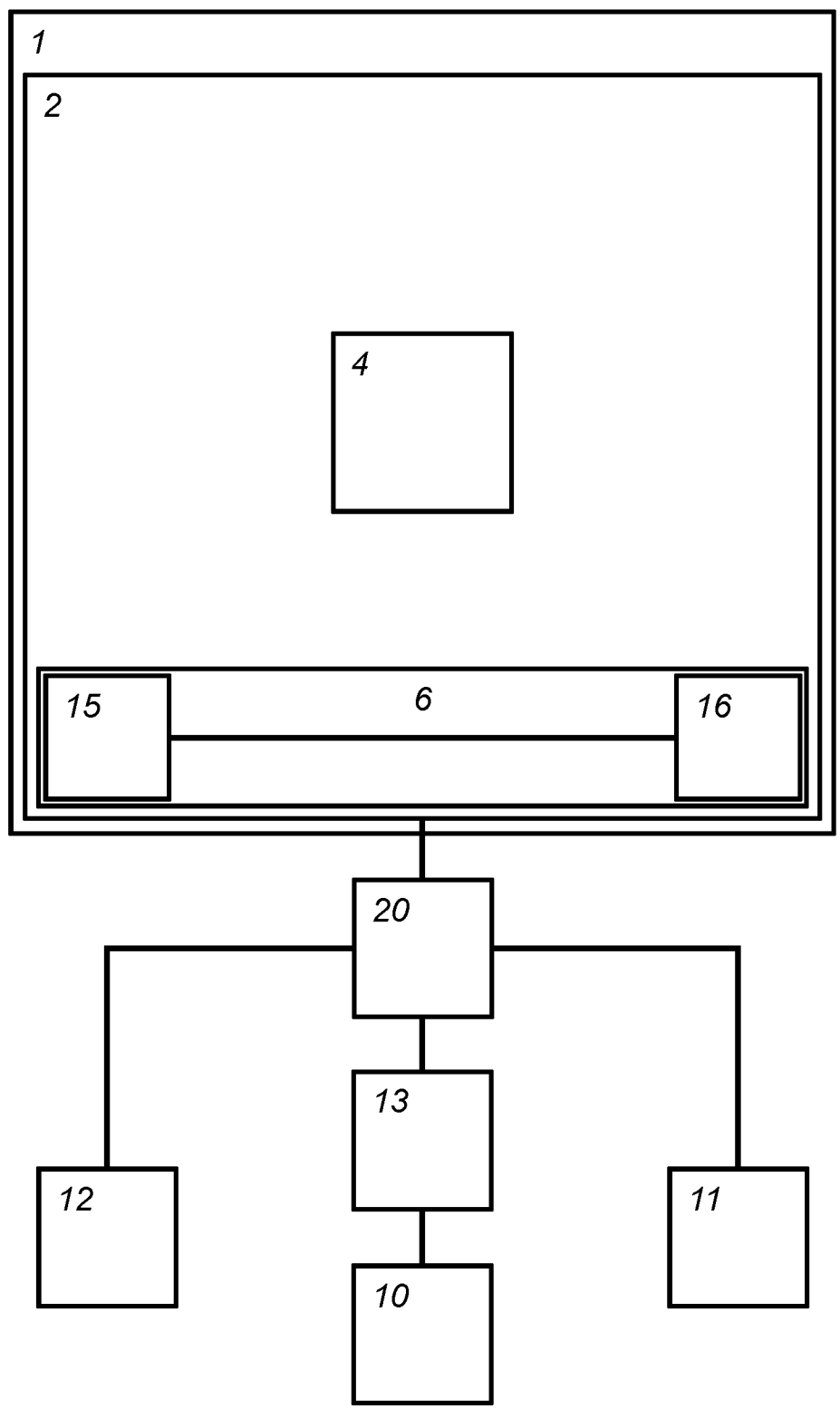
FIG. 2 illustrates an alternative schematic embodiment of an automatic dishwasher according to the present invention.

FIG. 2 depicts an alternative embodiment of the present invention. In this embodiment, the first and second supply lines are each connected to the same intermediate delivery region 20, adapted to deliver the first and second compositions at different times, depending upon the stage of the cycle, via adjustable nozzles 15, 16 on the spray arm 6. These nozzles 15, 16 are provided with adjustable apertures which are adjustable between a configuration for producing a mist for delivering the bleach composition, and a jet for delivering the second composition. Alternatively, the delivery region 20 may be provided with selective outputs, with separate delivery mechanisms for each composition. Multiple spray arms may be provided within the chamber, each selectively delivering the bleach or second composition.

EXAMPLES

The following experiments were carried out as a proof of concept. In each experiment, four teacups were prepared with tea soil according to the standard IKW method and placed upside down on the upper rack of a Miele G651 SC Plus dishwasher machine, alongside wares stained with enzymatic soils.

Example A

In this set of experiments, the absolute amount of cleaning chemicals used was maintained constant.

A liquid bleach-containing formulation was prepared according to the following method. 0.5 L of 9° dH water was heated to 50° C. 2.04 g sodium percarbonate, 2.5 g silicate-based alkalinity source/builder, 0.63 g bleach activator, 0.74 g co-builder and 6 mg bleach catalyst was used. This formula was added to the heated water. The water was stirred for 5 minutes until the solid was dissolved to give a transparent solution. This solution was delivered via two separate methods.

In a first test, the 0.5 L solution was poured into a trigger spray bottle and pressure was applied using a pump until air began to escape from the safety valve. The liquid spray was then applied from the bottle by hand with movement to cover the whole volume of the machine, with particular attention given to the inner surfaces of the teacups, thereby simulating mist creation by the machine. In a subsequent stage, a formulation comprising amylase and protease was delivered via the normal spray arm of the machine to wash the enzymatic soils.

In a second, comparative test, the 0.5 L solution was added to a further 2.5 L of 9° dH water at 50° C. and the full 3 L volume was poured directly into the bottom of the dishwasher. The spray arm was then rotated at maximum speed for two minutes to distribute the solution. (In this example, it was not possible to deliver only 0.5 L solution via the spray arm of this particular dishwasher, since insufficient pressure is generated to drive the spray arm.) In a subsequent stage, the same enzymatic formulation as used in the first test was delivered in the same manner to wash the enzymatic soils.

The wares were allowed to dry at room temperature for 30 minutes before being assessed by trained individuals, according to the standard IKW method. This method provides a score for the degree of cleaning between 1 to 10, with 10 being completely clean.

The teacups treated conventionally by the spray arm achieved bleach scores of 6.9. Meanwhile, the teacups treated by the trigger spray achieved bleach scores of 10. Enzymatic cleaning was good in both cases.

These results clearly indicate that the delivery of the bleach composition as a fine mist in the dishwasher results in a more effective application of bleach than conventional methods. Indeed, the more effective application was achieved with 2.5 L less water use overall.

Example B

This set of experiments was carried out using an equal concentration of bleach chemistry for each delivery method. The bleach chemistry used for the trigger spray was as above, while the bleach chemistry used for the spray arm used 6 times as much of each chemical. This ensured constant concentrations of 4.08 g/L Sodium percarbonate, 5 g/L Silicate-based alkalinity source/builder, 1.26 g/L bleach activator, 1.48 g/L co-builder and 12 mg/L bleach catalyst.

The method of the test above was then repeated, resulting in bleach scores of 8.3 for the conventionally treated teacups, and 10 for the trigger spray. Accordingly, it can be seen that the advantage of the present invention lies not only in the use of less water, but that delivery of the bleach composition in mist form provides more effective cleaning.

The invention claimed is:

1. A method of automatic dishwashing consisting of:
    delivering a first cleaning composition comprising a bleach a cleaning volume to contact soiled wares and optionally subsequently draining the first cleaning composition from the cleaning volume;
    delivering a first rinsing composition to the cleaning volume as a mist or a jet to contact the soiled wares after delivery of the first cleaning composition and optionally subsequently draining the first rinsing composition from the cleaning volume;
    delivering a second cleaning composition different from the first cleaning composition separately to the cleaning volume to contact the soiled wares and optionally subsequently draining the second cleaning composition from the cleaning volume;
    delivering a second rinsing composition to the cleaning volume as a mist or a jet after delivery of the second cleaning composition and optionally subsequently draining the second rinsing composition from the cleaning volume; and
    optionally delivering a third rinsing composition to the cleaning volume after delivery of the second rinsing composition and optionally subsequently draining the first rinsing composition from the cleaning volume, wherein:
    the first cleaning composition is delivered to the cleaning volume as a mist and the second cleaning composition is delivered to the cleaning volume as a jet;
    the first and second cleaning compositions are delivered to the cleaning volume at a temperature below 100° C.;
    the second cleaning composition is bleach-free and comprises at least one enzyme, the enzyme selected from the group consisting of an amylase, protease, cellulose, pectinase, mannanase, lipase, lipoxygenase, tannase, laccase, peroxygenase, and gluco-oxygenase,
    the first cleaning composition is delivered at a lower momentum than the second cleaning composition,
    the ratio of momentum between the first and second cleaning compositions is at least 1:3,
    the first cleaning composition is delivered with a lower mass flow rate than the second cleaning composition,
    the ratio of mass flow rate between the first and second cleaning compositions is at least 1:3, and
    the cleaning volume is 3 L,
    the first cleaning composition is delivered with a mean particle size of from 5 to 500 microns and/or the first cleaning composition has a DV(10) of 35 microns, and
    one or both of the first and second rinsing compositions comprise a non-ionic surfactant.

2. The method of claim 1, wherein
    a density of a mist plume of the first cleaning composition is lower than a density of the jet of the second cleaning composition.

3. The method of claim 1, wherein one or more of:
    the at least one rinsing composition is delivered as a mist;
    the at least one rinsing composition is delivered after delivering the first and second cleaning compositions; and
    the at least one rinsing composition is delivered between the delivery of the first and cleaning second compositions.

4. The method of claim 1, wherein the first cleaning composition is delivered to an area of the cleaning volume located above the soiled wares.

5. The method of claim 1, wherein a density of a mist plume of the first cleaning composition is lower than a density of the jet of the second cleaning composition; and
    the ratio of density between the first and second cleaning compositions is at least 1:3.

6. The method of claim 1, wherein the first cleaning composition is delivered to the cleaning volume prior to the delivery of the second cleaning composition.

* * * * *